(12) United States Patent
Goyal et al.

(10) Patent No.: US 11,743,295 B2
(45) Date of Patent: *Aug. 29, 2023

(54) METHODS AND APPARATUS TO PROVIDE RESOURCE SECURITY

(71) Applicant: VMWARE, INC., Palo Alto, CA (US)

(72) Inventors: Pravin Goyal, Bangalore (IN);
Gregory A. Frascadore, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/368,713

(22) Filed: Jul. 6, 2021

(65) Prior Publication Data
US 2021/0336995 A1    Oct. 28, 2021

Related U.S. Application Data

(63) Continuation of application No. 15/423,592, filed on Feb. 3, 2017, now Pat. No. 11,057,431.

(30) Foreign Application Priority Data

Sep. 22, 2016 (IN) .............................. 201641032402

(51) Int. Cl.
*H04L 29/06* (2006.01)
*H04L 9/40* (2022.01)

(52) U.S. Cl.
CPC .............. *H04L 63/20* (2013.01); *H04L 63/10* (2013.01)

(58) Field of Classification Search
CPC ................................. H04L 63/10; H04L 63/20
USPC .............................................................. 726/1
See application file for complete search history.

(56) References Cited

U.S. PATENT DOCUMENTS

| | | |
|---|---|---|
| 11,057,431 B2 | 7/2021 | Goyal et al. |
| 2003/0074580 A1 | 4/2003 | Knouse et al. |
| 2014/0201816 A1* | 7/2014 | Brannon ............... H04L 63/102 726/4 |
| 2014/0331277 A1* | 11/2014 | Frascadore ........... G06F 21/577 726/1 |

(Continued)

OTHER PUBLICATIONS

United States Patent and Trademark Office, "Final Office Action," issued in connection with U.S. Appl. No. 15/423,592, dated Nov. 18, 2020, 12 pages.

(Continued)

*Primary Examiner* — Jeffrey C Pwu
*Assistant Examiner* — Nega Woldemariam
(74) *Attorney, Agent, or Firm* — HANLEY, FLIGHT & ZIMMERMAN, LLC

(57) ABSTRACT

Methods, apparatus, systems and articles of manufacture to provide resource security are disclosed. Example methods and apparatus manage a benchmark specific to a resource, the benchmark created during development of the resource and including a collection of rules to constrain behavior of the resource, enable a rule of the benchmark that corresponds with a type of the resource, disable a rule of the benchmark that does not correspond with the type of the resource, test the enabled rule of the benchmark against the resource, identify an insufficiency of the resource based on the enabled rule of the benchmark, and remediate the insufficiency of the resource to comply with the enabled rule of the benchmark.

20 Claims, 11 Drawing Sheets

(56) References Cited

U.S. PATENT DOCUMENTS

2014/0380405 A1   12/2014   Forsberg et al.
2016/0072815 A1   3/2016    Rieke et al.
2017/0359370 A1   12/2017   Humphries et al.

OTHER PUBLICATIONS

United States Patent and Trademark Office, "Final Office Action," issued in connection with U.S. Appl. No. 15/423,592, dated Dec. 11, 2019, 10 pages.

United States Patent and Trademark Office, "Final Office Action," issued in connection with U.S. Appl. No. 15/423,592, dated Mar. 21, 2019, 11 pages.

United States Patent and Trademark Office, "Non-Final Office Action," issued in connection with U.S. Appl. No. 15/423,592, dated Jun. 10, 2020, 10 pages.

United States Patent and Trademark Office, "Non-Final Office Action," issued in connection with U.S. Appl. No. 15/423,592, dated Jul. 10, 2019, 8 pages.

United States Patent and Trademark Office, "Non-Final Office Action," issued in connection with U.S. Appl. No. 15/423,592, dated Sep. 19, 2018, 11 pages.

United States Patent and Trademark Office, "Notice of Allowance and Fee(s) Due," issued in connection with U.S. Appl. No. 15/423,592, dated Mar. 3, 2021, 6 pages.

Frascadore et al., "Productizing Product Security," VMware RADIO Event Paper, RADIO 2016, 6 pages.

Frascadore et al., "Patent Disclosure," Mar. 2016, 10 pages.

United States Patent and Trademark Office, "Advisory Action," issued in connection with U.S. Appl. No. 15/423,592, dated Mar. 6, 2020, 3 pages.

* cited by examiner

METHODS AND APPARATUS TO PROVIDE RESOURCE SECURITY

RELATED APPLICATION

This patent arises from a continuation of U.S. patent application Ser. No. 15/423,592, (now U.S. Pat. No. 11,057, 431) which was filed on Feb. 3, 2017. U.S. patent application Ser. No. 15/423,592 is hereby incorporated herein by reference in its entirety. Priority to U.S. patent application Ser. No. 15/423,592 is hereby claimed.

FIELD OF THE DISCLOSURE

This disclosure relates generally to the security of computing devices and, more particularly, to methods and apparatus to provide resource security.

BACKGROUND

In recent years, security vulnerabilities in products and/or services have caused data corruption; access to and/or the conversion of otherwise prohibited content, information, privileges, etc.; disclosure of private information; monetary loss; reputation damage, etc. Often, security vulnerabilities affect both product/service providers and consumers of vulnerable products and/or services. Accordingly, providers and consumers are frequently concerned whether they are susceptible to security vulnerabilities of products and/or services.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
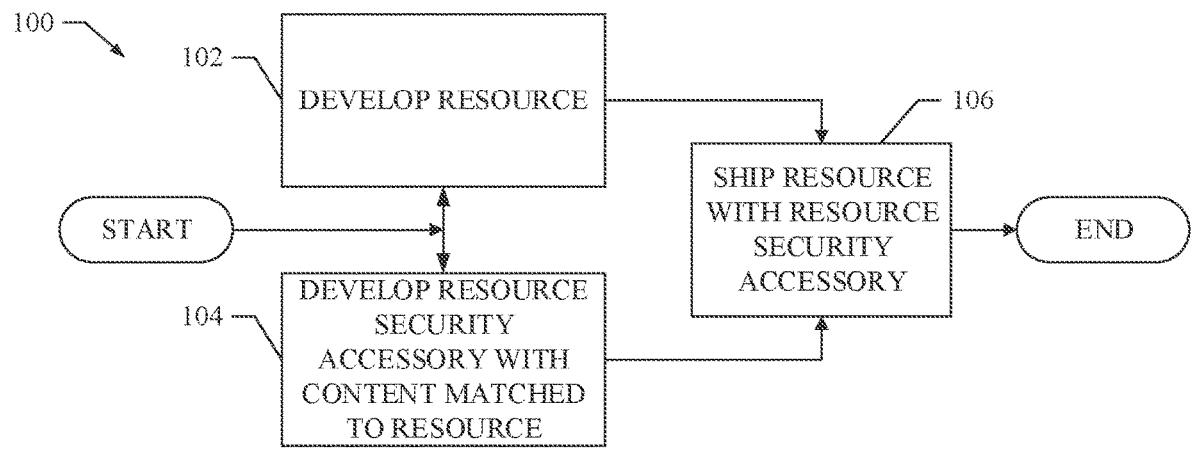
FIG. 1 is an illustration of a process flow for development of a resource and a security accessory.

Computing resources (sometimes referred to herein as "resources") are physical/virtual computing devices and/or software applications; any or all of which may be offered as a product and/or service. Example resources include, virtual machines (VMs); software appliances; management agents, such as a Common Information Management (CIM) agent, a Simple Network Management Protocol (SNMP) agent and/or a configuration management agent; cloud services; mobile agents (e.g., mobile software application code and a corresponding application state); and/or business services (e.g., Information Technology Infrastructure Library services).

Computing resources are susceptible to security vulnerabilities. Security vulnerabilities are problematic as they may lead to unrestricted access to prohibited information. Often, when security vulnerabilities are discovered, they are publicized by a vulnerability database such as, for example, the National Vulnerability Database. Even after publication of a new vulnerability, consumers of potentially affected devices and/or services may be unaware of whether such potentially affected devices and/or services are actually vulnerable. Upon such publication, consumers of such devices and/or services may request verbal or textual assurances from the appropriate product and/or service providers. However, verbal or textual assurances may not be enough for consumers, especially where a consumer must prove to another party (e.g., to an auditor conducting an audit) that a product and/or service utilized by the consumer is not vulnerable. Up to now, consumers have lacked (1) a way to determine whether a product and/or service is susceptible to particular vulnerability and, (2) if the product and/or service is susceptible to the particular vulnerability, a way to remediate the particular vulnerability.

Sometimes, consumers must prove to another party that its products and/or services are in line with one or more resource policies. Resource policies place constraints on the state or behavior of computing devices. Some policies ensure computing devices are being used securely and in compliance with safety standards and/or government regulations (e.g., in connection with vulnerabilities or in the absence of vulnerabilities). Example policies include defense information systems agency (DISA) secure technical implementation guides (STIGS) and payment card industry data security standards (PCI-DSS).

Resource policies may include a number of textual rules and/or regulations. As used herein, a benchmark is defined to be a collection of resource policies to constrain the behavior of a resource. In some examples, resource policies and/or benchmarks are implemented via machine-readable instructions for execution by a security accessory in computer-readable format (such as, for example, in an extensive markup language (XML) document). A security accessory may be implemented by a server, a virtual machine, and/or a container executing on a processor. Example benchmarks include SCAP/OVAL® documents. SCAP is a standard XML format for U.S. government security benchmarks. It is also an interoperable rule language used by several open source projects. OpenSCAP by Red Hat® is an open source tool that interprets SCAP and scans target systems for configuration issues. SCAP rules encapsulate assessment content as well as remediation content for systems capable of configuration specification and change such as, for example, Shell Script, Python, Perl, or Ansible by Red Hat® snippets. OVAL® is an international information security community standard for assessing vulnerabilities, configurations, patch states, etc., and reporting the results of this assessment.

Benchmarks may be selected after development of a resource and according to business objectives. For example, a business utilizing a resource may select a benchmark that requires passwords to have a minimum length of four characters, even where a product and/or service provider intended the resource to have passwords with a minimum length of fifteen characters, if the lower password length would improve efficiency of the business.

Not all policy rules are applicable to all resources. For example, a policy that requires a secure Apache™ web server configuration may contain rules that are not applicable to a PostgreSQL™ database server. Within a policy, some rules may be inapplicable to certain resources. For example, an Apache™ web server rule requiring Unix® file permissions is inapplicable to Apache™ web server running on Microsoft Windows®. Often the testing of rules differs for different resources. For example, testing a Linux® resource includes running the "stat(1)" system call. However, Microsoft Windows® does not support "stat(1)". As such, testing a Windows® resource includes running "GetFileAttributes." In some circumstances, multiple tools are required to test and enforce policies. A policy rule may use an assessor such as, for example, OpenSCAP to evaluate policy rules against a target resource. The Security Content Automation Protocol (SCAP) rules can specify several different check systems such as, for example, the open vulnerability assessment language (OVAL®), script check engine (SCE), extensible computer language (ECL), or open checklist interactive language (OCIL). The SCAP rules may also specify several fix systems such as, for example, Shell Script, Python, Perl, Java, etc.

Some benchmarks include many different types of rules, each requiring a different assessment engine for interpreting the rule and comparing the rule against the resource. Sometimes, a number of different responses may be invoked when a resource is in violation of a rule, such as, for example, generating an alert, repairing the resource so that it conforms to the rule, disabling the resource or a portion thereof, etc.

In order to prove a resource is not vulnerable and/or to prove compliance with a resource policy, a resource manager (e.g., an individual in charge of managing resources) is sometimes supposed to:
1. Create for every resource, an execution environment (e.g., a host, a virtual machine, a container, etc.) in which appropriate assessment engines may run;
2. Identify which benchmark(s) are appropriate for a resource;
3. Instantiate the selected benchmark(s) in the virtual machine or container;
4. Identify which rule(s) of the selected benchmark(s) are appropriate for the resource type;
5. Identify which tool(s) are required to assess the resource against the selected rule(s) of the selected benchmark(s);
6. Install the tool(s) required to assess the resource against the selected rule(s) of the selected benchmark(s);
7. Identify which libraries are required for the too(s) to run the test(s) against the selected rule(s) of the selected benchmark(s);
8. Establish a secure channel for acquiring libraries required for the tool(s) to run the test(s) against the selected rule(s) of the selected benchmark(s);
9. Update the selected benchmark(s) frequently to ensure the testing is not performed with an outdated benchmark;
10. Identify which tool(s) are required to remediate any defect(s); and/or
11. Install the tool(s) required to remediate defect(s).

Additionally, there may be more than one way to remediate a defect, such that a resource manager must choose between many options on how remediate the defect. As a result, it is possible that the resource manager will make one or more incorrect decisions during implementation of the above procedure. Indeed, the resource manager may fail to complete the above procedure.

Examples disclosed herein (1) determine whether a product and/or service is susceptible to a particular vulnerability and/or is in compliance with one or more resource policies and, (2) if the product and/or service is susceptible to the particular vulnerability and/or is not in compliance with the one or more resource policies, remediate the particular vulnerability or non-compliance. Some examples disclosed herein are implemented via containers in which benchmarks that are unique to a resource are executed. Such containers include rules appropriate for the resource type, the tools required to evaluate the resource against the appropriate rules of the benchmarks, the libraries required by the tools, authenticators to establish a secure channel between the container and the resource, the tools required to remediate any defects, and the best solutions for the remediation of defects for that resource.

As used herein, a profile is defined to be a structure that includes rules from one or more benchmarks and default or custom rule parameters. In some examples, a profile is a SCAP XML document. As disclosed herein, target resources are assessed against benchmark profiles. As used herein, tailoring is defined to be the action of customizing a benchmark by creating a profile that selects/excludes benchmark rules and/or specifies benchmark parameter values. As used herein, remediation is defined to be the action of applying a repair (e.g., by executing a repair script) to a resource which (at least prior to the repair) is in non-compliance with a rule from a benchmark profile (e.g., a SCAP rule). As used herein, hardening is defined to be the action of applying all repairs (e.g., by executing all repair scripts) in a tailored benchmark that are applicable to the target resource. Benchmarks may be developed in connection with the resource in which the benchmark is to be associated.

FIG. 1 is an illustration of an example process flow 100, which may be performed by one, or more example methods and apparatus disclosed herein. Contrary to developing benchmarks after a resource has been created, example methods and apparatus disclosed herein develop a resource (e.g., at block 102) simultaneously or substantially simultaneously with a resource security accessory, which implements one or more benchmarks (e.g., at block 104). In some examples, the resource security accessory is applied to the resource to prepare the resource for shipping. In some examples, for each resource, a corresponding resource security accessory is developed with content matched to (e.g., made specifically for) the resource. A product and/or service provider equips the resource security accessory with the benchmarks the product and/or service provider intends the resource to meet, along with specific remediation actions, remediators, and/or assessors to keep the resource in conformity with the benchmarks. For example, if a product and/or service provider intends that the resource be password-protected with at least a fifteen character password, the resource security accessory will include a benchmark requiring at least fifteen characters in passwords, a tool to verify that password creation setting is set to at least fifteen characters, and a remediation action to fix the setting if found non-compliant. As a result, the resource is held to a standardized benchmark. At block 106, the resource and the resource security accessory are shipped/delivered together. In some examples, shipping/delivering the resource and the resource accessory includes providing a downloadable virtual machine or executable container including both the resource and the resource security accessory. In some examples, shipping/delivering the resource and the resource accessory includes providing the resource to a user and storing the resource security accessory in a user-accessible repository, as further described with reference to FIG. 2.

Figure 2:
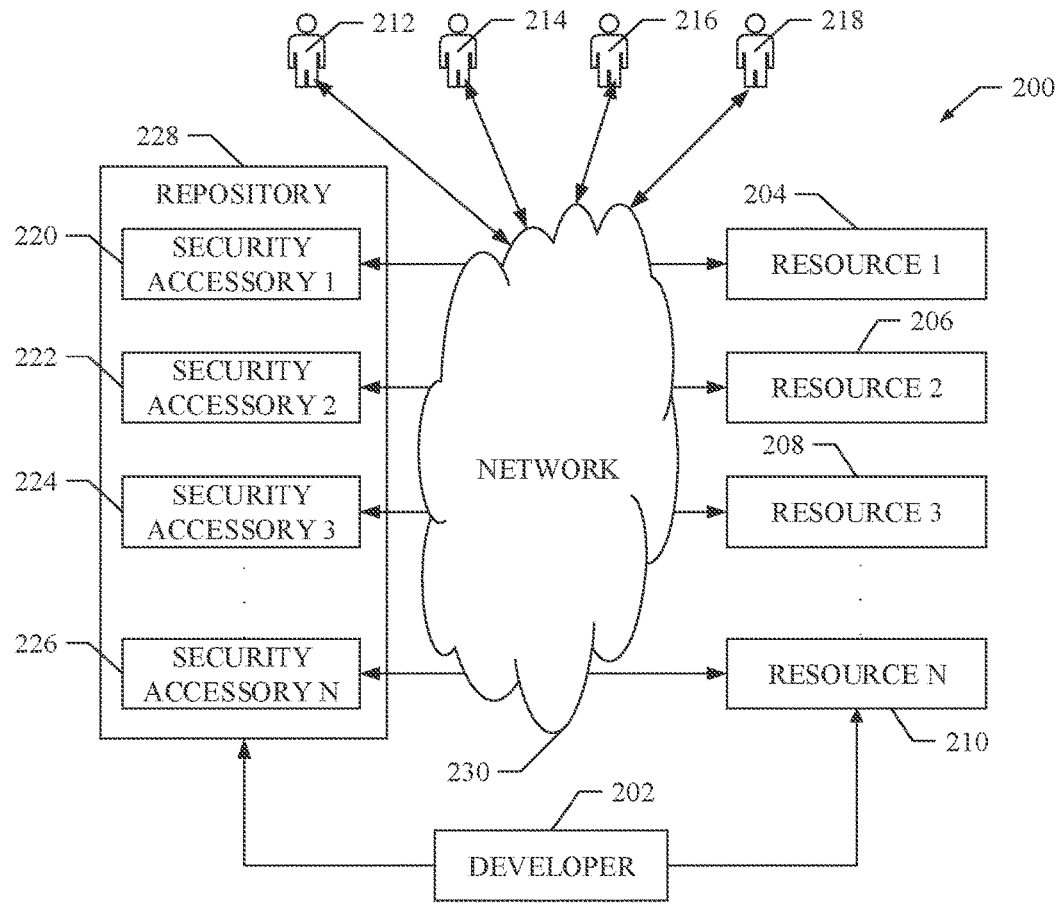
FIG. 2 is an illustration of an example environment including a plurality of resources and security accessories developed accordingly to FIG. 1.

FIG. 2 is a block diagram of an example environment 200 illustrating a developer 202 shipping/delivering a plurality of resources 204, 206, 208, 210 to a plurality of users 212, 214, 216, 218, respectively. As disclosed above, the example developer 202 stores a plurality of security accessories 220, 222, 224, 226 in a repository 228. In the illustrated example of FIG. 2, the repository 228 is in a location remote from the plurality of resources 204, 206, 208, 210 and/or the plurality of users 212, 214, 216, 218. In some examples, the plurality of resources 204, 206, 208, 210 connect to respective ones of the plurality of security accessories 220, 222, 224, 226 in the repository 228 through a network 230 (e.g., the Internet). Additionally, the plurality of users access the plurality of resources 204, 206, 208, 210 and/or the plurality of security accessories 220, 222, 224, 226 through the example network 230. In some examples, the network connections are secure channels between respective ones of the plurality of resources 204, 206, 208, 210 and respective ones of the plurality of security accessories 220, 222, 224, 226. In the illustrated example of FIG. 2, the developer 202 may push new and/or updated content to the plurality of security accessories 220, 222, 224, 226. As a result, when a resource (e.g., resource 1, 204) attempts to execute its respective security accessory (e.g., security accessory 1, 220) from the repository 228, the resource executes the most updated security accessory. In such examples, the security accessory updates are transparent to the resource and ensure that the resource is always assessed against the latest security requirements for that resource.

Figure 3A:
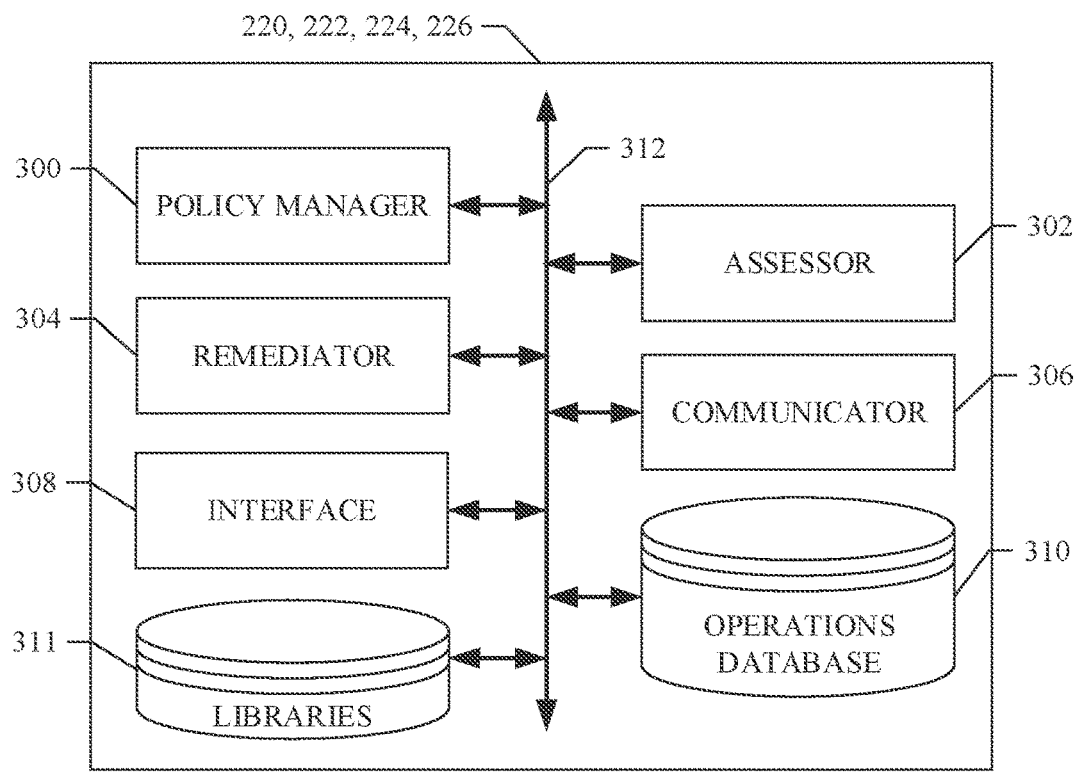
FIG. 3A is a block diagram of an example implementation of a security accessory of FIG. 2.

FIG. 3A is a block diagram of an example implementation of any one (or all) of the security accessories 220, 222, 224, 226 of FIG. 2. The example implementation of the security accessory 220, 222, 224, 226 includes an example policy manager 300, an example assessor 302, an example remediator 304, an example communicator 306, an example interface 308, an example operations database 310, and example libraries 311. In some examples, the policy manager 300, the assessor 302, the remediator 304, the communicator 306, the interface 308, the operations database 310, and the example libraries 311 are communicatively coupled via a bus 312 or other communication medium. In some examples, the security accessories 220, 220, 224, 226 are disposed in a remote repository 228 and in secure communication with one or more respective resources 204, 206, 208, 210 over the network 230 (FIG. 2).

The example policy manager 300 of FIG. 3A manages benchmarks, rules within benchmarks, STIGS, hardening guides, and remediation actions targeted to a resource. The targeted resource may be one of a plurality of resources associated with the security accessory. For example, security accessory 1 220 is developed in association with resource 1 204. However, one or more instances of resource 1 204 may be sold, distributed, etc. to consumers. In such examples, the example policy manager 300 receives an identifier corresponding to a target resource (e.g., an identification of one of the one or more instances of resource 1 204) from a user of the target resource (e.g., an internet protocol (IP) address of the resource). In some examples, the example policy manager 300 determines a type of the target resource. For example, the resource type may include a type of operating system (OS) (e.g., Linux®, Windows®, etc.). In such examples, the example policy manager 300 enables rules applicable to the resource type and/or disables rules inapplicable to the resource type. For example, one or more rules of a benchmark may be inapplicable to a Window® OS. In some examples, the policy manager 300 retrieves, updates, and/or stores benchmark profiles and/or associated benchmark parameters within the operations database 310. In some examples, the policy manager 300 generates reports based on assessments from the example assessor 302, remediations from the example remediator 304, information received via the example communicator 306, user instructions received via the example interface 308, and/or data from the example operations database 310.

The example assessor 302 of FIG. 3A tests, evaluates, or otherwise assesses a target resource against one or more rules of one or more benchmarks for vulnerabilities, benchmark non-compliance, etc. (e.g., defects or insufficiencies). The example assessor 302 is developed specifically for a specific resource (e.g., resource 1 204), such that the example assessor 302 is specifically adapted to interpret and assess all benchmarks and/or rules for the corresponding resource. In some examples, the assessor is implemented by an OpenSCAP assessment engine. In the illustrated example of FIG. 3A, the assessor 302 executes in the security accessory. In some examples, the assessor 302 sends modules (e.g., including benchmark rules) to the target resource for execution via the communicator 306. In such examples, the modules (e.g., benchmark rules) are temporarily stored at the target resource during execution. In some examples, the assessor 302 assesses the target resource against parameters of benchmark rules/benchmark profiles, such as when a benchmark profile has been tailored by a user.

The example remediator 304 of FIG. 3A executes remediation actions for a target resource based on defects or insufficiencies identified by the example assessor 302. In some examples, the remediator 304 is implemented by an Ansible action engine. In some examples, the remediator 304 requires additional content (e.g., libraries) to perform remediation actions associated with rule(s) of benchmark(s) targeted to a resource. In such examples, the remediator 304 retrieves the additional content from the operations database 310. The example remediator 304 of FIG. 3A sends modules (e.g., snippets or scripts) containing remediation actions (e.g., machine executable remediation instructions) to a target resource. The remediation actions, when executed at the target resource, cure, repair, and/or fix the defects or insufficiencies identified by the example assessor 302. In such examples, the modules are temporarily stored on the target resource during execution. As disclosed herein, the remediator 304 applies remediation action idempotently. In other words, the desired state of the resource is unchanged even if application of remediation actions are applied several times after initial application. As disclosed herein, the example remediator 304 is developed specifically for a specific resource (e.g., resource 1 204), such that one or more appropriate remediation actions are provided for each rule violation of that corresponding resource.

The example communicator 306 of FIG. 3A communicates with resources to receive information with which the assessor 302 is to test or evaluate against, to send remediation actions, assessment results with which the resource is to execute or a user is to interpret. In some examples, the data from the target resource checked by the assessor 302 contains confidential information (e.g., password policy settings). In some examples, the remediation actions sent to the target resource contains sensitive values (e.g., certificates the target should trust). In some such examples, because confidential data travels to and from the security accessory as it works to verify policy compliance, the example communicator 306 initiates a secure channel between the security accessory and the target resource. In some examples, the communicator 306 initiates the secure channel using OpenSSH. As disclosed herein, the example communicator 306 is developed specifically for a specific resource such that the example communicator 306 and the resource include security protocols and libraries sufficient to protect communications corresponding to assessment by the assessor 302 and/or remediation by the remediator 304. The example communicator 306 and the corresponding target resource include security credentials such as, for example, mutual secrets, certificates, keypairs, etc. As disclosed above, there may be one instance of a particular security accessory and multiple instance of the corresponding target resource. In some examples, there are multiple instances of a security accessory and one or more instances of the corresponding resource.

The example interface 308 of FIG. 3A facilitates interaction between a user of the resource and the associated security accessory. In some examples, the interface 308 is a web-based graphical user interface (GUI) accessible to users/developers over a network (e.g., the Internet). In some examples, the interface 308 is a command line user interface (CLI) accessible to users/developers of the resource to which the security accessory is targeted. In some examples, the interface 308 is a representational state transfer (REST) application programming interface (API). The example interface 308 receives commands from a user/developer and display information (e.g., reports) to a user/developer. In some examples, the interface is implemented by an open-source web server such as, for example, Apache Tomcat.

Figure 3B:
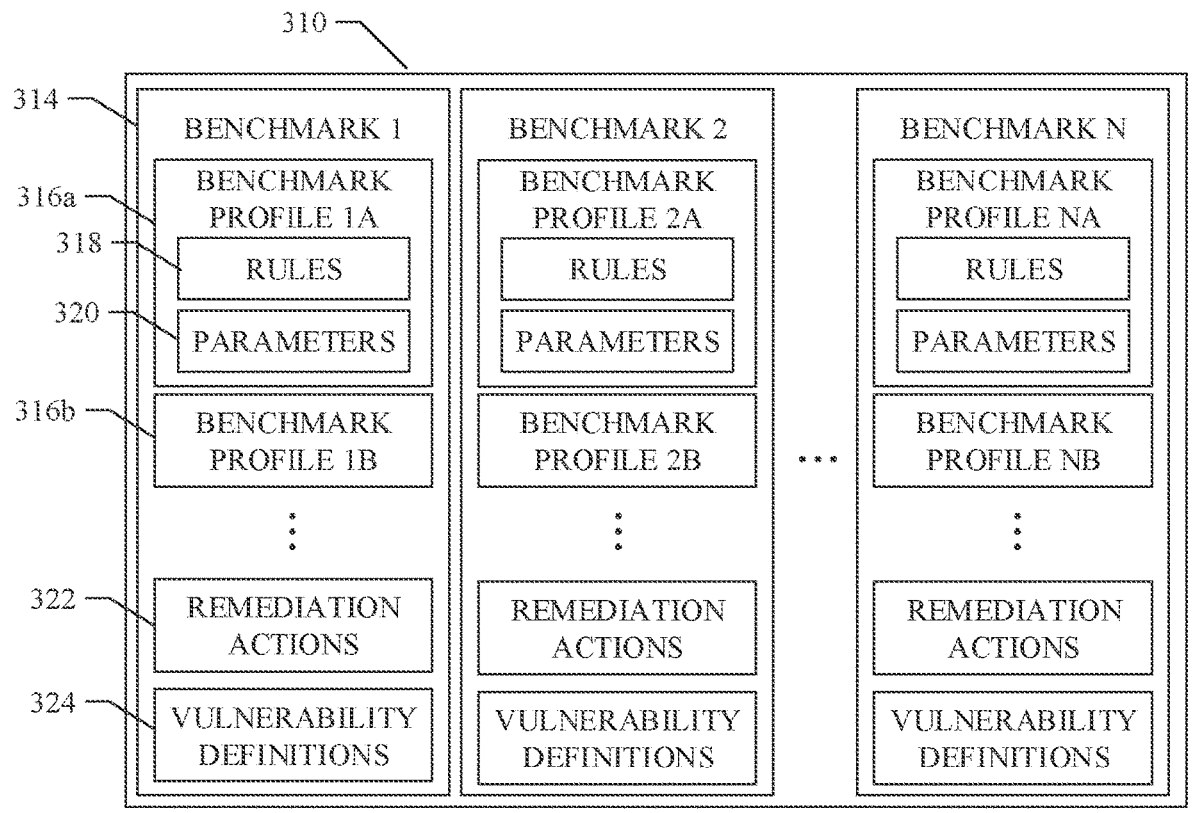
FIG. 3B is a block diagram illustrating example components with an operations database of FIG. 3A.
Figure 4:
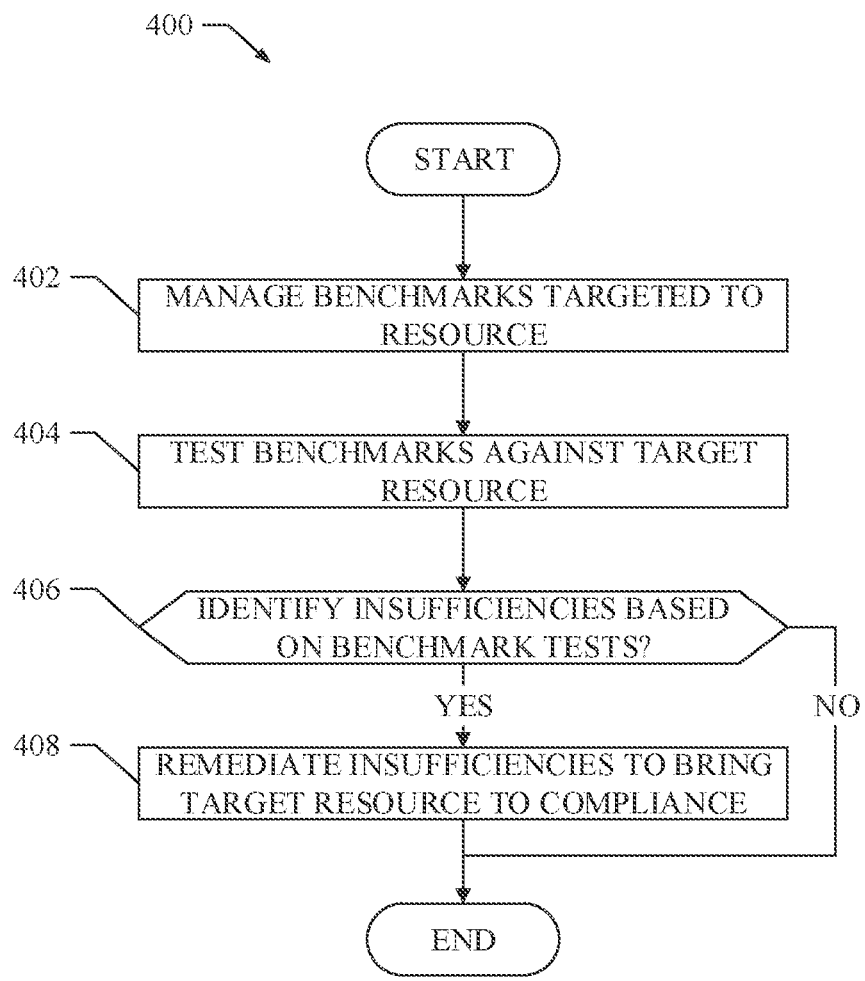
FIGS. 4-11 are flowcharts illustrative of machine-readable instructions that may be executed to implement the example security accessory of FIG. 3A.

The example libraries 311 of FIG. 3A include content associated with the remediation actions and/or the assessor 302 modules such as, for example, configuration data, documentation, templates, subroutines, data sets, etc. The example operations database 310 of FIG. 3A includes rules (e.g., benchmarks, STIGS, hardening guides, etc.), remediation actions, profiles (e.g., SCAP profiles and tailoring), and/or vulnerability definitions. FIG. 3B is a block diagram illustrating an example implementation of the operations database 310 of FIG. 3A. The example operations database 310 of FIG. 3B includes benchmarks 314 (e.g., benchmark 1, benchmark 2 . . . benchmark N), benchmark profiles (e.g., benchmark profile 1A 316a and benchmark profile 1B 316b), rules 318, parameters 320, remediation actions 322, and/or vulnerability definitions 324.

In the illustrated example of FIG. 3B, the benchmarks 314 (e.g., benchmark 1, includes a plurality of rules (e.g., 100). In some examples, each benchmark profile include subsets of the plurality of rules. For example, the benchmark profile 1A 316a may include a first subset of rules (e.g., rules 1-10), while the benchmark profile 1B 316b may include a second subset of rules (e.g., rules 56-65). As disclosed herein, any number of benchmark profiles may be created using any combination of the plurality of rules corresponding to a benchmark. The parameters 320 are associated with benchmark profiles and customizable based on user instructions. The vulnerability definitions 324 of FIG. 3B include definitions of known vulnerabilities recently publicized by, for example, the National Vulnerability Database.

In operation, the example policy manager 300, the example assessor 302, the example remediator 304, the example communicator 306, the example interface 308, and the example operations database 310 of the security accessory perform one or more functions based on user commands, such as, for example, describe, tailor, monitor, maintain, assess and repair, harden, and report. In some examples, the describe function of the security accessory filters out rules that are inapplicable to the target resource and displays the applicable rules to a user, as further described with reference to FIG. 5. In some examples, the tailor function of the security accessory allows a user to enable, disable, or tailor specific policy rules by editing profile parameters, as further described with reference to FIG. 6. In some examples, the monitor function of the security accessory monitors the target resource for non-compliant configuration changes and reports them via the interface 308 as they occur, as further described with reference to FIG. 7. In some examples, the maintain function invokes remediation actions for any rule that fails after a configuration change to force the target resource to remain in compliance with the selected benchmark and/or benchmark profile, as further described with reference to FIG. 8. In some examples, the assess and repair function generates a report of rule compliance and invokes response actions of violated policy rules based on user instructions, as further described with reference to FIG. 9. In some examples, the harden function invokes all remediations of all enabled rules, as further described with reference to FIG. 10. In some examples, the report function generates a report of rule compliance history and presents the report to a user via the interface 308, as further described with reference to FIG. 11.

While an example manner of implementing the security accessories 220, 222, 224, 226 of FIG. 2 is illustrated in FIG. 3A, one or more of the elements, processes and/or devices illustrated in FIG. 3A may be combined, divided, re-arranged, omitted, eliminated and/or implemented in any other way. Further, the example policy manager 300, the example assessor 302, the example remediator 304, the example communicator 306, the example interface 308, the example operations database 310, and/or, more generally, the security accessory 220, 222, 224, 226 of FIG. 3A may be implemented by hardware, software, firmware and/or any combination of hardware, software and/or firmware. Thus, for example, any of the example policy manager 300, the example assessor 302, the example remediator 304, the example communicator 306, the example interface 308, the example operations database 310, and/or, more generally, the security accessory 220, 222, 224, 226 of FIG. 3A could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example policy manager 300, the example assessor 302, the example remediator 304, the example communicator 306, the example interface 308, and/or the example operations database 310 is/are hereby expressly defined to include a non-transitory computer readable storage device or storage disk such as a memory, a digital versatile disk (DVD), a compact disk (CD), a Blu-ray disk, etc. storing the software and/or firmware. Further still, the example security accessories 220, 222, 224, 226 of FIG. 2 may include one or more elements, processes and/or devices in addition to, or instead of, those illustrated in FIG. 3A, and/or may include more than one of any or all of the illustrated elements, processes and devices.

Flowcharts representative of example machine readable instructions for implementing the security accessories 220, 222, 224, 226 of FIG. 3A are shown in FIGS. 4-11. In these examples, the machine readable instructions comprise programs for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIGS. 4-11, many other methods of implementing the example security accessories 220, 222, 224, 226 may alternatively be used. For example, the order of execution of the blocks may be changed, and/or some of the blocks described may be changed, eliminated, or combined.

As mentioned above, the example processes of FIGS. 4-11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIGS. 4-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIGS. 4-11 are flowcharts illustrative of machine-readable instructions that may be executed to implement an example security accessory (e.g., any one or all of the example security accessories 220, 222, 224, 226 of FIG. 3A). An example program 400 that may be executed to implement an example security accessory (e.g., security accessory 1 220) begins at block 402 of FIG. 4. At block 402, the example policy manager 300 of the example security accessory (e.g., security accessory 1 220) manages benchmarks targeted to a resource (e.g., resource 1 204). For example, the example policy manager 300 receives identifiers of resource(s); identifies types of the resource(s); locates, updates, and/or adds new benchmark(s) and/or benchmark profile(s) corresponding to the benchmark(s); enables/disables rule(s) within the benchmark(s) based on the resource type; and/or generates reports based on the resource(s), benchmark(s), benchmark profile(s), rule(s), etc.

At block 404, the example assessor 302 tests (e.g., evaluates) the one or more benchmarks against a target resource. Accordingly, the example assessor 302 evaluates rules of the one or more benchmarks to the resource to determine resource insufficiencies (e.g., policy non-conformance and/or vulnerabilities). If the example assessor 302 identifies resource insufficiencies based on the output of block 404 (block 406: YES), the control proceeds to block 408. Otherwise (block 406: NO), the example program 400 ceases operation. At block 408, the example remediator 304 remediates and identified insufficiencies of the resource to comply with the enabled rules of the one or more benchmarks. Thereafter, the example program ceases operation.

Figure 5:
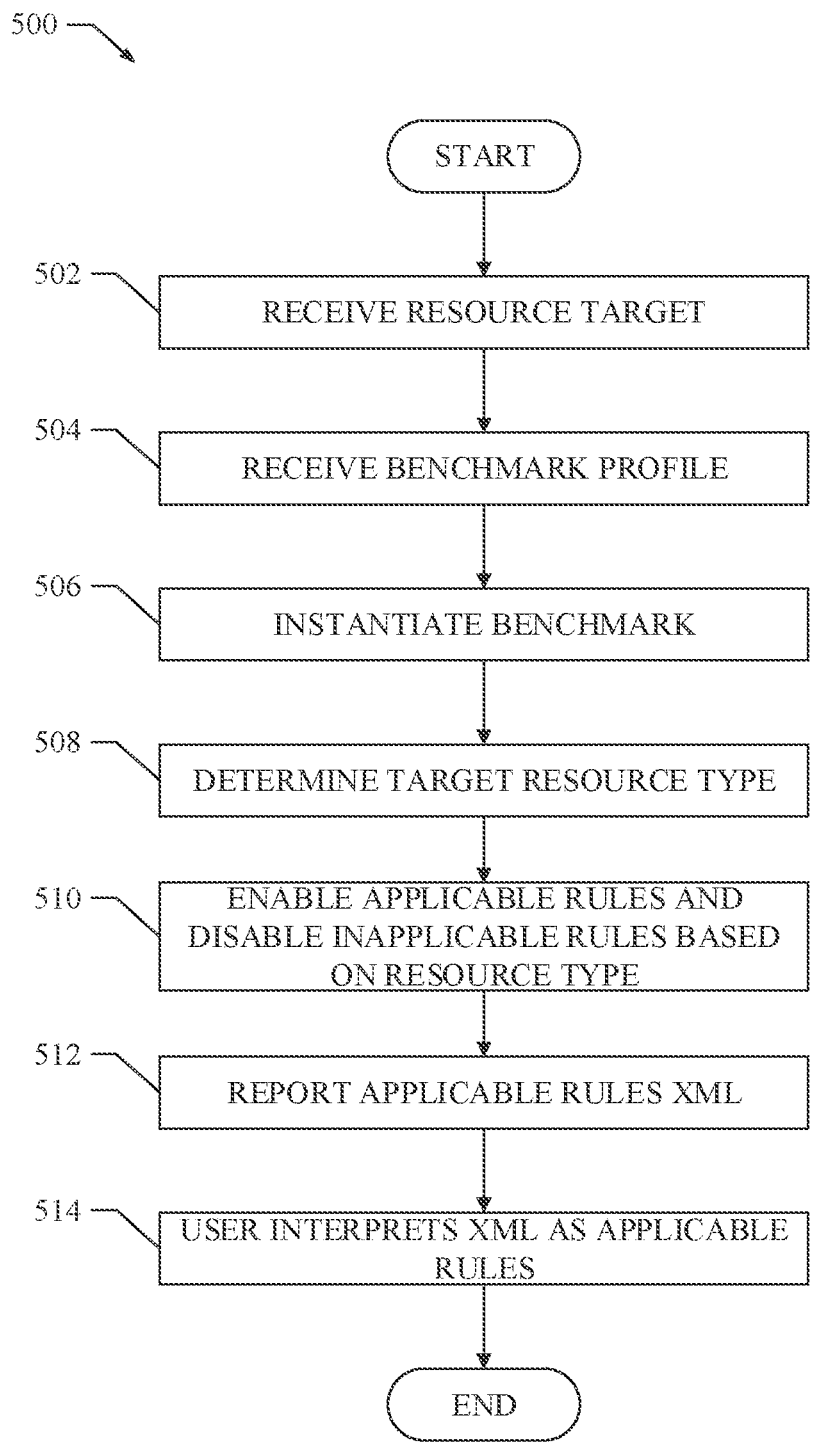

An example program 500 that may be executed to implement the "describe" command by an example security accessory (e.g., security accessory 1 220) begins at block 502 of FIG. 5. At block 502, the example policy manager 300 receives an identifier of a resource target (e.g., by a user identifying the resource). The resource target may be one of a plurality of resources associated with the security accessory (e.g., there may be an instance of resource 1 204 for every user such that there are multiple instances of resource 1 204, but the multiple instances of resource 1 204 may be associated with the same security accessory 1 220). At block 504, the example policy manager 300 receives a user selection of a benchmark profile for the target resource. At block 506, the example assessor 302 instantiates a benchmark based on the received user selection of the benchmark profile for the target resource (e.g., instantiated from the one or more benchmark profiles stored in the operations database 310 corresponding to the received user selection). The example policy manager 300 determines the type of the target resource at block 508. At block 510, the example policy manager 300 enables rules contained in the instantiated benchmark associated with the benchmark profile corresponding to the received user selection, which are applicable with the resource type and/or disables rules contained in the instantiated benchmark associated with the benchmark profile corresponding to the received user selection, which are inapplicable with the resource type. For example, one or more rules of a benchmark may be inapplicable to a type of the resource (e.g., the benchmark includes rules for Linux® and Windows® operating systems (OS), while the resource only uses Window® OS). The example communicator 306 communicates the applicable rules in an XML report to the target resource (block 512). As described herein, previous techniques failed to provide rules for different resources and/or failed to identify applicable rules for a resource amongst a plurality of benchmark rules. In the illustrated example of FIG. 5, the communicator 306 identifies exactly the rules amongst a plurality of benchmark rules that are specifically applicable to the target resource. In some examples, the communication is through a secure channel between the security accessory and the resource. In some examples, the example interface 308 displays the XML, report at block 514 for user interpretation as the applicable rules for the resource. In some examples, the interface 308 displays the XML report for user interpretation as a hardening guide. Thereafter, the example program 500 ceases operation.

Figure 6:
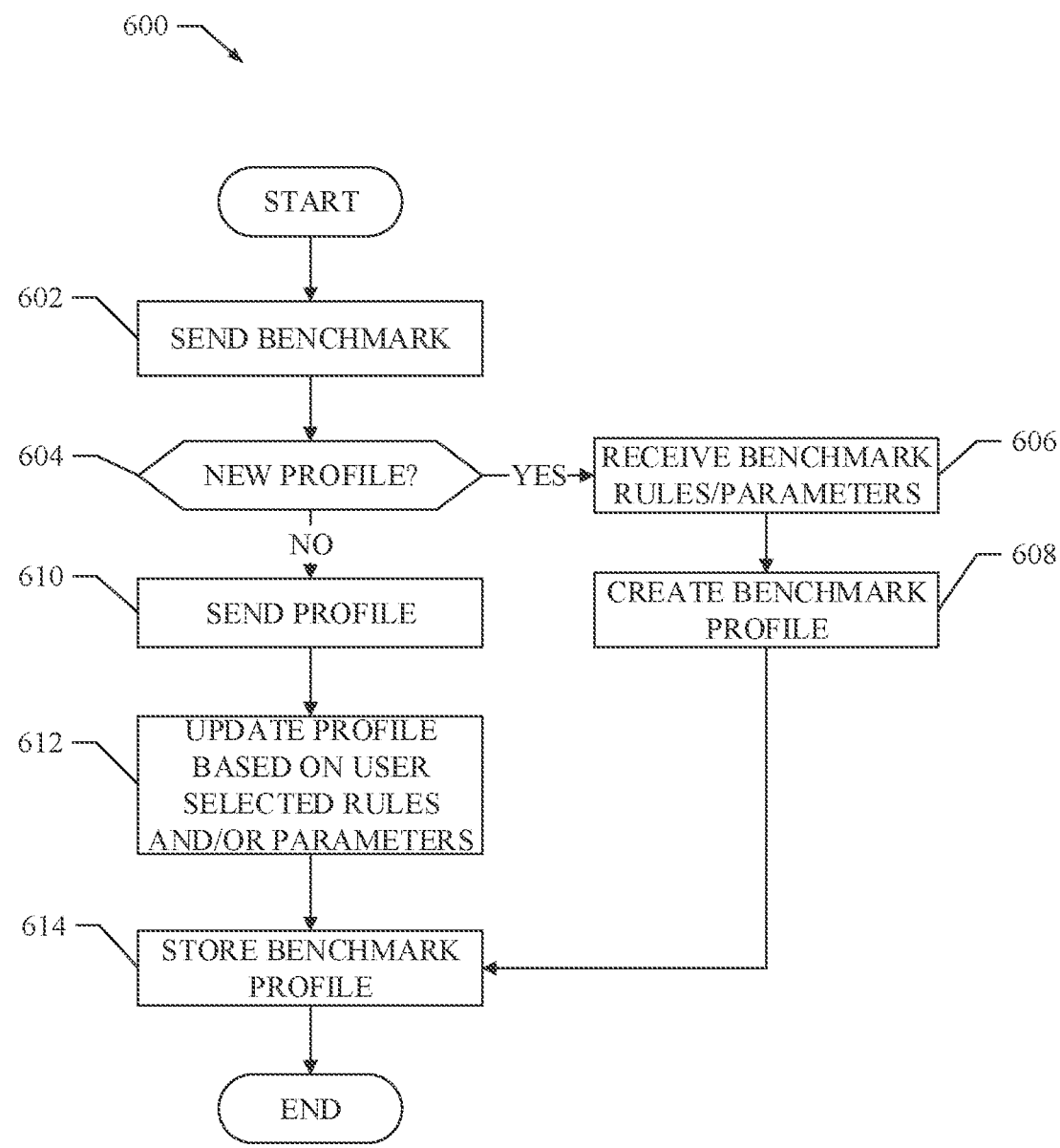

An example program 600 that may be executed to implement the "tailor" command by the example security accessory (e.g., security accessory 1 220) begins at block 602 of FIG. 6. At block 602, the example policy manager 300 sends a benchmark to a resource based upon a user selection, such that the user may supply parameters for and/or add new profiles corresponding with the benchmark (e.g., tailor benchmark profiles). At block 604, the example policy manager 300 receives a user instruction of whether to create a new benchmark profile or supply parameters for an existing benchmark profile. If a user decides to create a new benchmark profile (block 604: YES), control proceeds to block 606. At block 606, the example policy manager 300 receives benchmark rules and/or parameters (e.g., from a user) corresponding to the benchmark. The received benchmark rules correspond to which rules (e.g., out of a plurality of benchmark rules) to include in a profile and the received parameters correspond to additional constraints beyond that included in the initial rules. For example, a rule of the benchmark may require password length to be fifteen characters by default and a user may include a parameter to increase the required password length to be twenty characters (e.g., the user tailors the benchmark profile to fit his or her needs). In some examples, a user can only tailor a benchmark profile to increase constraints rather than lower or remove them, thereby ensuring a resource is held to a minimum security standard. At block 608, the example policy manager 300 creates a benchmark profile based on the parameters received at block 606.

However, if the policy manager 300 receives a user instruction to supply parameters for an existing benchmark (block 6042: NO), control proceeds from block 604 to block 610. At block 610, the example policy manager 300 sends a user selected benchmark profile to the resource. In some examples, a user provides parameters for the existing benchmark profile. At block 612, the example policy manager 300 updates the benchmark profile based on the user supplied rules and/or parameters. After the example policy manager 300 updates the benchmark profile at block 612 or after the example policy manager 300 creates a benchmark profile at block 608, control proceeds to block 614. At bock 614, the example policy manager 300 stores the benchmark profile in the operations database 310. Thereafter, the example program 600 ceases operation.

Figure 7:
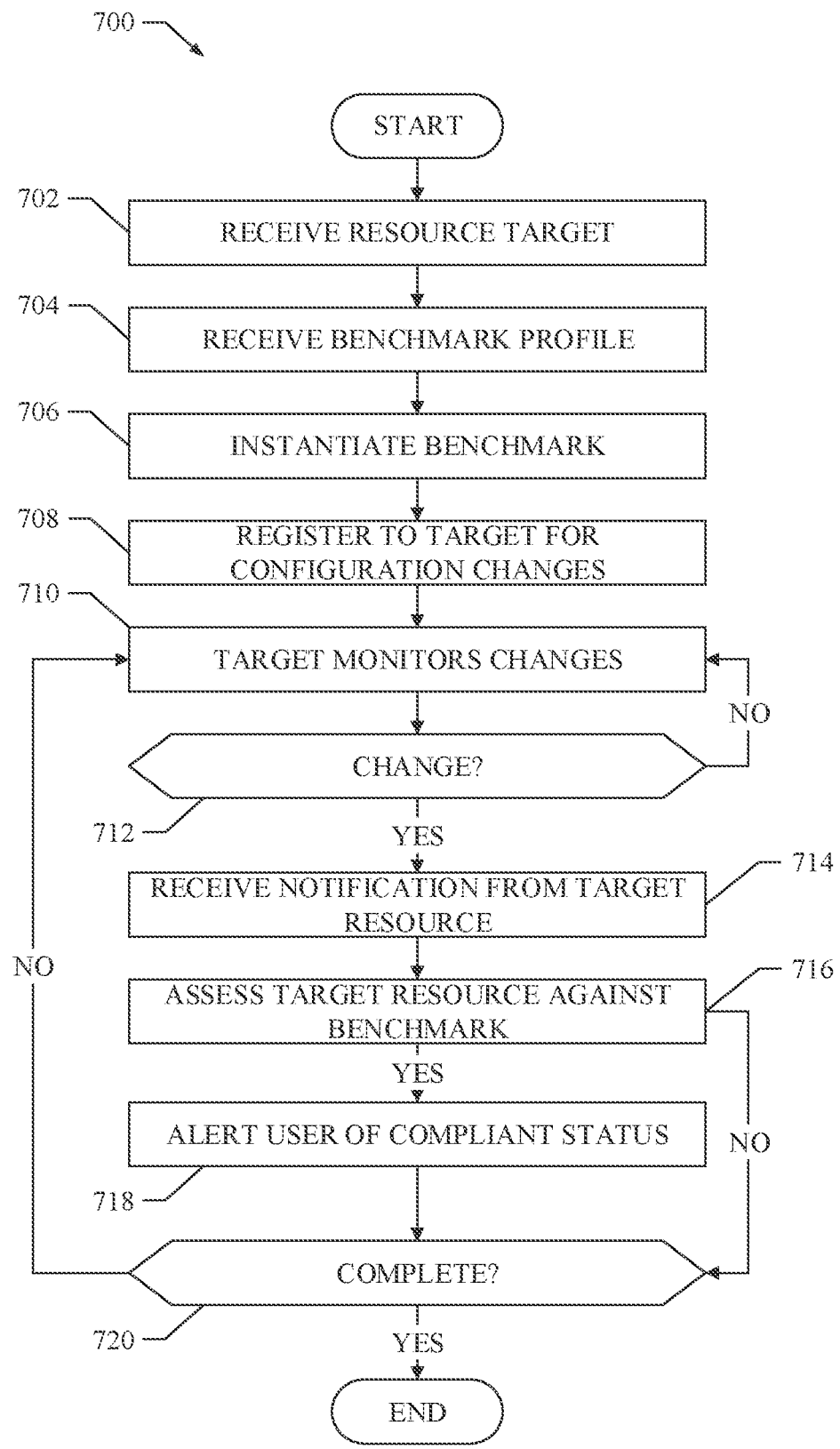

An example program 700 that may be executed to implement the "monitor" command by the example security accessory begins at block 702 of FIG. 7. At block 702, the example policy manager 300 receives an identifier of a resource target (e.g., by a user identifying the resource). At block 704, the example policy manager 300 receives a user selection of a benchmark profile for the target resource. At block 706, the example assessor 302 instantiates a benchmark based on the received user selection of the benchmark profile for the target resource (e.g., instantiated from the one or more benchmark profiles stored in the operations database 310 corresponding to the received user selection). At block 708, the example assessor 302 instructs the target resource to monitor for changes in configurations that could affect benchmark compliance. At block 710, the target resource monitors for changes. For example, a user may install a new application, operating system, etc. If a change occurs (block 712: YES), control proceeds to block 714. Otherwise (block 712: NO), control dwells at block 710 until an event causing the end of monitoring occurs.

At block 714, the example assessor 302 receives a notification from the target resource that a configuration change has occurred. The example assessor 302 assesses the target resource against the benchmark instantiated at block 706 for defects or insufficiencies such as, for example, vulnerabilities, benchmark non-compliance, etc. (block 716). At block 718, the example communicator 306 sends an alert for presentation to a user via the interface 308. In some examples, the alert notifies users of compliant status of the resource (e.g., compliance and/or non-compliance). At block 720, the example assessor 302 determines whether assessment is complete and/or if monitoring is to terminate. If the example assessor 302 has not completed the assessment and/or monitoring is to continue (block 720: NO), control returns to block 710. Otherwise (block 720: YES), the example program 700 ceases operation.

Figure 8:
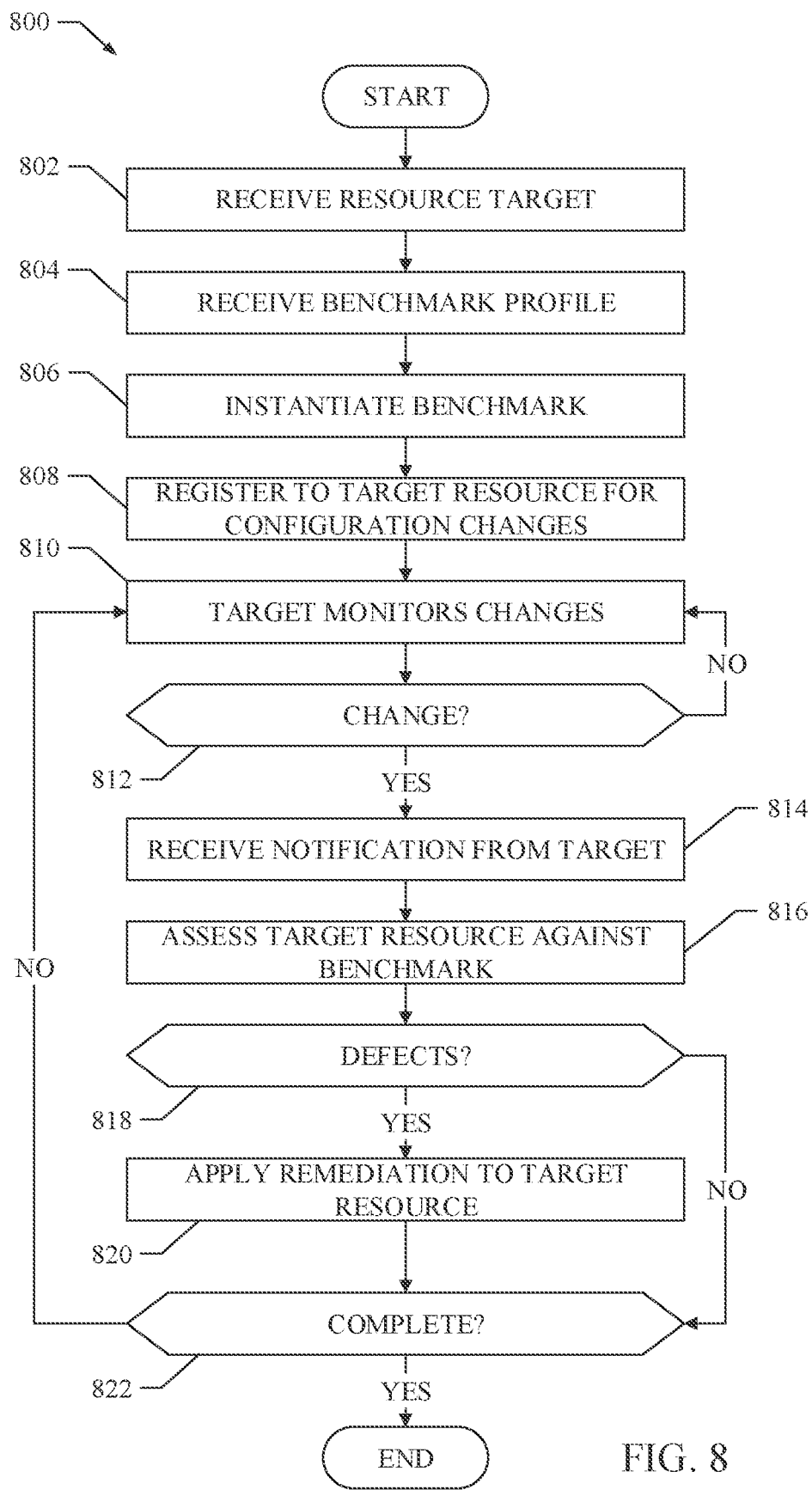

An example program 800 that may be executed to implement the "maintain" command by the example security accessory (e.g., security accessory 1 220) begins at block 802 of FIG. 8. At block 802, the example policy manager 300 receives an identifier of a resource target (e.g., from a user identifying the resource). At block 804, the example policy manager 300 receives a user selection of a benchmark profile for the target resource. At block 806, the example assessor 302 instantiates a benchmark based on the received user selection of the benchmark profile for the target resource (e.g., instantiated from the one or more benchmark profiles stored in the operations database 310 corresponding to the received user selection). At block 808, the example assessor 302 instructs the target resource to monitor for changes in configurations that could affect benchmark compliance. At block 810, the target resource monitors for changes. If a change occurs (block 812: YES), control proceeds to block 814. Otherwise (block 812: NO), control dwells at block 810 until an event causing the end of monitoring occurs.

At block 814, the example assessor 302 receives a notification from the target resource that a configuration change has occurred. The example assessor 302 assesses the target resource against the benchmark instantiated at block 806 for defects or insufficiencies such as, for example, vulnerabilities, benchmark non-compliance, etc. (block 816). If the example assessor 302 identifies a defect or insufficiency (block 818: YES), control proceeds to block 820. At block 820, the example remediator 304 instructs the example communicator 306 to send remediation actions to the target resource. The remediation actions are then executed at the target resource to bring the target resource into compliance with the corresponding policy. After block 820 or if the example assessor 302 does not identify a defect or insufficiency (block 818: NO), control proceeds to block 822. At block 822, the example assessor 302 determines whether the assessment is complete and/or if monitoring is to terminate. If the example assessor 302 has not completed the assessment and/or monitoring is to continue (block 822: NO), control returns to block 810. Otherwise (block 822: YES), the example program 800 ceases operation.

Figure 9:
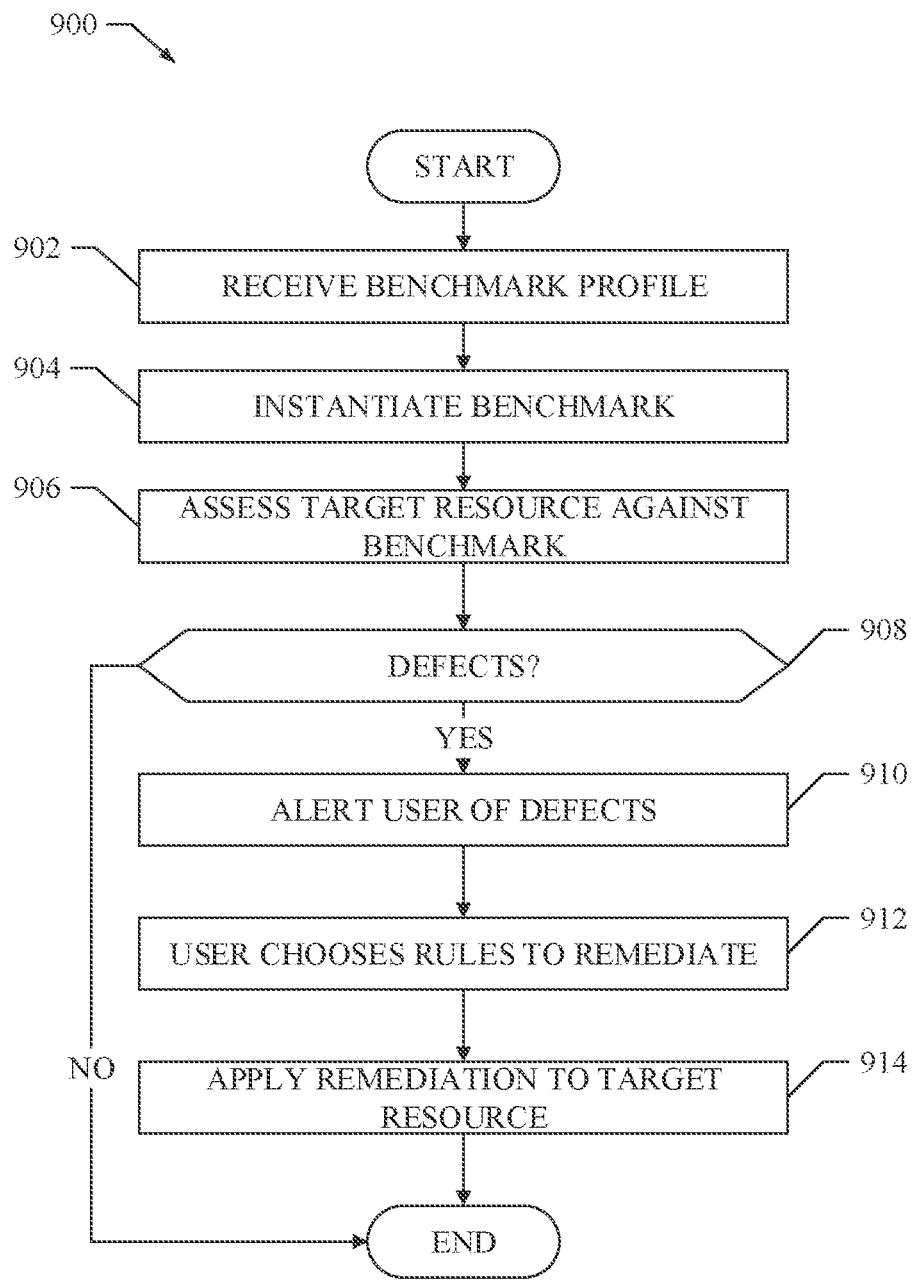

An example program 900 that may be executed to implement the "assess and repair" command by the example security accessory (e.g., security accessory 1 220) begins at block 902 of FIG. 9. At block 902, the example policy manager 300 receives a user selection of a benchmark profile for the target resource. At block 904, the example assessor 302 instantiates a benchmark based on the received user selection of the benchmark profile for the target resource (e.g., instantiated from the one or more benchmark profiles stored in the operations database 310 corresponding to the received user selection). At block 906, the example assessor 302 assesses the target resource against the benchmark instantiated at block 904 for defects or insufficiencies such as, for example, vulnerabilities, benchmark non-compliance, etc. For example, if four character length passwords are being utilized on a resource with a benchmark requiring fifteen character length passwords, the example assessor 302 identifies that the resource is not in compliance with such a benchmark (e.g., the resource has a defect, insufficiency, etc.). If the example assessor 302 identifies a defect or insufficiency (block 908: YES), control proceeds to block 910. At block 910, the example communicator 306 sends an alert for presentation to a user via the interface 308 identifying one or more defects or insufficiencies. At block 912, the user selects one or more of the defects or insufficiencies for remediation. At block 914, the example remediator 304 instructs the example communicator 306 to send remediation actions rules to the target resource based on the user selected defects or insufficiencies. The target resource will then execute the remediation actions to cure, repair, fix, or otherwise bring into compliance the selected defects or insufficiencies. After block 914 or if the example assessor 302 does not identify a defect or insufficiency (block 908: NO), the example program 900 ceases operation.

Figure 10:
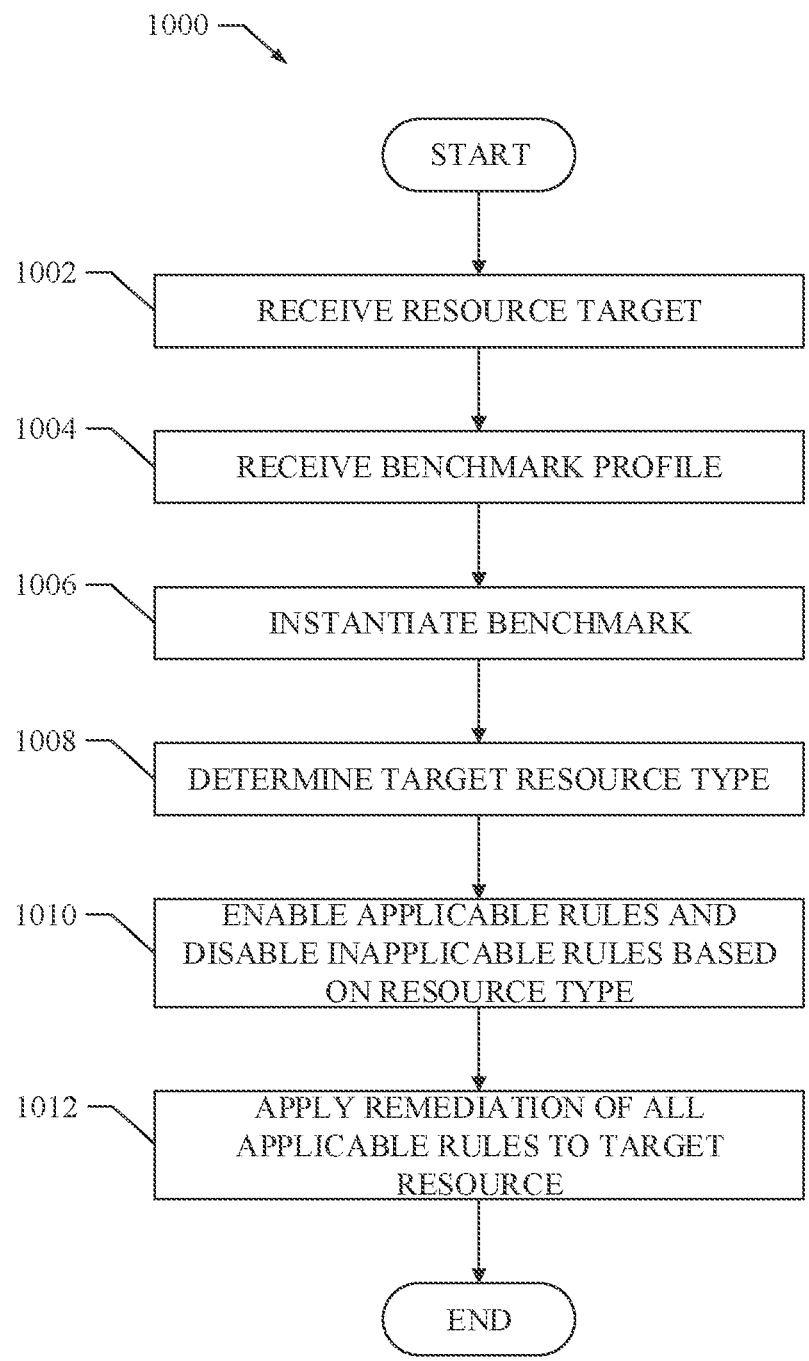

An example program 1000 that may be executed to implement the "harden" command by the example security accessory (e.g., security accessory 1 220) begins at block 1002 of FIG. 10. At block 1002, the example policy manager 300 receives an identifier of a resource target (e.g., by a user identifying the resource). At block 1004, the example policy manager 300 receives a user selection of a benchmark profile for the target resource. At block 1006, the example assessor 302 instantiates a benchmark based on the user selection of the benchmark profile for the target resource (e.g., instantiated from the one or more benchmark profiles stored in the operations database 310 corresponding to the user selection). The example policy manager 300 determines the type of the target resource at block 1008. At block 1010, the example policy manager 300 enables rules contained in the instantiated benchmark associated with the benchmark profile corresponding to the received user selection, which are applicable with the resource type and/or disables rules contained in the instantiated benchmark associated with the benchmark profile corresponding to the received user selection, which are inapplicable with the resource type. For example, one or more rules of a benchmark may be inapplicable to a type of the resource (e.g., the benchmark includes rules for Linux® and Windows® operating systems (OS), while the resource only uses Window® OS). At block 1012, the example remediator 304 instructs the example communicator 306 to send remediation actions of applicable rules to the target resource. Thereafter, the example program 1000 ceases operation.

Figure 11:
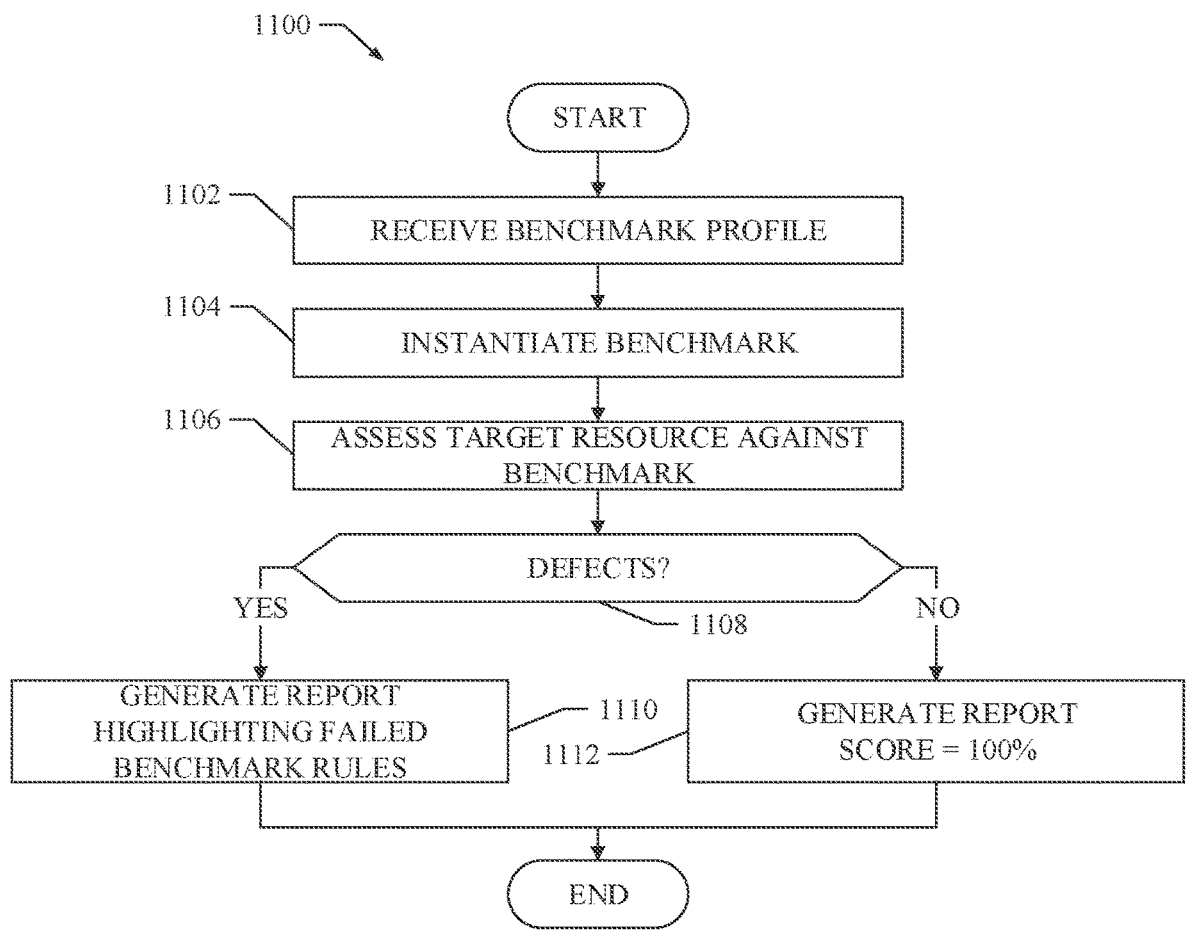

An example program 1100 that may be executed to implement the "report" command by the example security accessory (e.g., security accessory 1 220) begins at block 1102 of FIG. 11. At block 1102, the example policy manager 300 receives a user selection of benchmark profile for the target resource. At block 1104, the example assessor 302 instantiates a benchmark based on the user selection of the benchmark profile for the target resource (e.g., instantiated from the one or more benchmark profiles stored in the operations database 310 corresponding to the received user selection). At block 1106, the example assessor 302 assesses the target resource against the benchmark instantiated at block 1104 for defects or insufficiencies such as, for example, vulnerabilities, benchmark non-compliance, etc. If the example assessor 302 identifies a defect or insufficiency (block 1108: YES), control proceeds to block 1110. Otherwise (block 1108: NO), control proceeds to block 1112. At block 1110, the example policy manager 300 generates a report highlighting the rules with which the target resource is not in compliance and/or the rules with which the target resource is in compliance. At block 1112, the example policy manager 300 generates a report indicating that the resource is in complete compliance with the benchmark (e.g., score=100%). Thereafter, the example program 1100 ceases operation.

Figure 12:
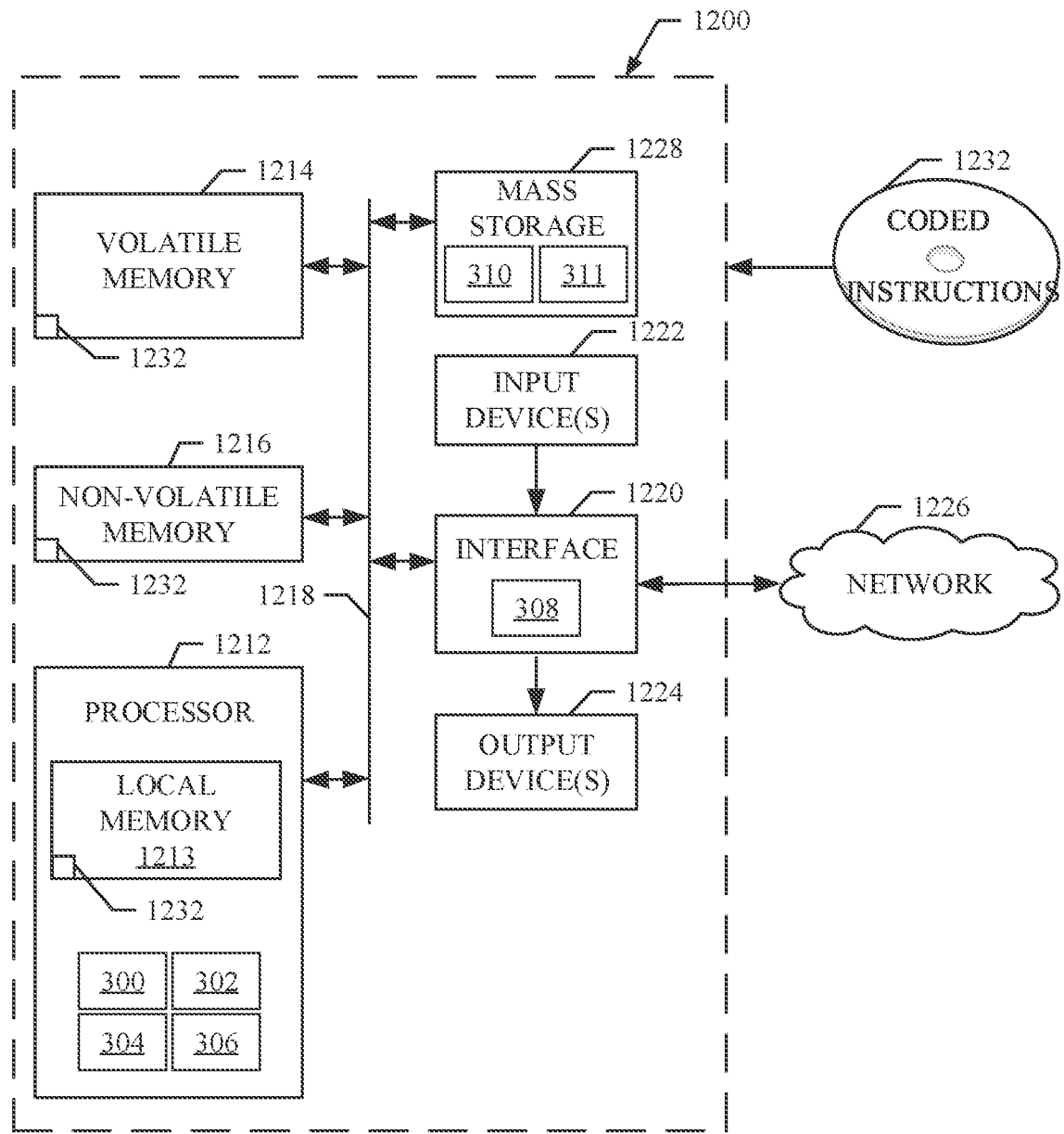
FIG. 12 is a block diagram of an example processor platform capable of executing the example machine-readable instructions of FIGS. 4-11 to implement the example security accessory of FIG. 3A.

FIG. 12 is a block diagram of an example processor platform 1200 capable of executing the instructions of FIGS. 4-11 to implement the example security accessory 220, 222, 224, 226 of FIG. 3A. The processor platform 1200 can be, for example, a server, a personal computer, a mobile device (e.g., a cell phone, a smart phone, a tablet such as an iPad™), or any other type of computing device. The processor platform 1200 may execute one or more VMs and/or containers in which the security accessor(ies) are instantiated.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In some examples, the processor 1212 implements the policy manager 300, the assessor 302, the remediator 304, the communicator 306, and/or the security accessory of FIG. 3A.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface. In some examples, interface circuit 1220 implements the interface 308 of FIG. 3A.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED)). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.). The interface circuit 1220 may, thus, implement the example communicator 306 of FIG. 3A.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives. In some examples, the operations database 310 and the libraries 311 of FIG. 3A are located within the one or more mass storage devices 1228.

The coded instructions 1232 of FIGS. 4-11 may be stored in the mass storage device 1228, in the volatile memory 1214, in the non-volatile memory 1216, and/or on a removable tangible computer readable storage medium such as a CD or DVD.

From the foregoing, it will be appreciated that methods, apparatus and articles of manufacture have been disclosed that combine STIGS, operational assessment content (checks), vulnerability definitions, remediation actions (fixes), configuration re-baselining (hardening), scanning tools, orchestration, and action frameworks, security posture reporting, auditing evidence, etc. into a security accessory, which is specifically targeted to several instantiations of a particular resource. In some examples, the security accessory enables rules specific to different types of the several instantiations of the particular resource (e.g., a first security accessory may be utilized by an instance of a first resource with a first OS and also an instance of the first resource with a second OS). The resource is provided specific benchmarks, definitions, and remediation actions customized for the resource. In some examples, tools and software are common to all security accessories, but the operations databases including benchmarks, profiles, remediation actions, and tests available to a particular security accessory are unique to the resource serviced by the accessory. The security accessory may be disposed on a remote server such that each associated resource remotely runs instantiations provided by a corresponding security accessory. Additionally, as product and/or service providers update the security accessory on the remote server, resources are provided with the most updated benchmarks, definitions, and remediation actions for the resource. In other words, updates can be applied once to a security accessory and thereafter propagated automatically to multiple instances of the corresponding resource.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   at least one memory;
   instructions in the apparatus; and
   processor circuitry to execute the instructions to:
   access a benchmark associated with a target resource, the benchmark including a profile that permits a user increase of a security constraint and prevents a user reduction of the security constraint;
   filter rules of the benchmark that are inapplicable to the target resource to determine a set of applicable rules;
   evaluate the target resource against of the set of applicable rules;
   in response to the evaluation, access an operations database including a remediation action on the target resource;
   make available a representational state transfer (REST) application programming interface (API) for configuration of the apparatus; and
   present a web-based graphical user interface to display a report from the apparatus including the set of applicable rules.

2. The apparatus of claim 1, wherein the processor circuitry is to execute the instructions in association with at least one of a virtual machine or an executable container, the at least one of the virtual machine or the executable container disposed on a server remote from the target resource.

3. The apparatus of claim 1, wherein the processor circuitry is to allow enabling, disabling, or tailoring ones of the plurality of rules by editing at least one profile parameter.

4. The apparatus of claim 3, wherein the processor circuitry is to invoke a remediation action for ones of the plurality of rules that fails after a change to the at least one profile parameter.

5. The apparatus of claim 1, wherein the processor circuitry is to execute the instructions to establish a secure communication with the target resource, the secure communication based on at least one of a mutual secret, a certificate, or a keypair.

6. The apparatus of claim 1, wherein the processor circuitry is to execute the instructions to operate a command line interface, and at least one of the command line interface or the web-based graphical user interface displays a report to a developer of the target resource.

7. The apparatus of claim 1, wherein the operations database includes at least one of a secure technical implementation guide, a hardening guide, a benchmark, or a security content automation profile.

8. A non-transitory computer readable medium comprising instructions, which, when executed, cause processor circuitry to at least:
   access a benchmark associated with a target resource, the benchmark including a profile that permits a user increase of a security constraint and prevents a user reduction of the security constraint;
   filter rules of the benchmark that are inapplicable to the target resource to determine a set of applicable rules;
   evaluate the target resource against of the set of applicable rules;
   in response to the evaluation, access an operations database including a remediation action on the target resource;
   make available a representational state transfer (REST) application programming interface (API) for configuration of the apparatus; and
   present a web-based graphical user interface to display a report from the apparatus including the set of applicable rules.

9. The non-transitory computer readable medium of claim 8, wherein the instructions, when executed, cause the processor circuitry to execute the instructions in association with at least one of a virtual machine or an executable container, the at least one of the virtual machine or the executable container disposed on a server remote from the target resource.

10. The non-transitory computer readable medium of claim 8, wherein the instructions, when executed, cause the processor circuitry to enable, disable, or tailor ones of the plurality of rules by editing at least one profile parameter.

11. The non-transitory computer readable medium of claim 10, wherein the instructions, when executed, cause the processor circuitry to invoke a remediation action for ones of the plurality of rules that fails after a change to the at least one profile parameter.

12. The non-transitory computer readable medium of claim 8, wherein the instructions, when executed, cause the processor circuitry to establish a secure communication with the target resource, the secure communication based on at least one of a mutual secret, a certificate, or a keypair.

13. The non-transitory computer readable medium of claim 8, wherein the instructions, when executed, cause the processor circuitry to execute the instructions to generate a command line interface.

14. The non-transitory computer readable medium of claim 13, wherein the instructions, when executed, cause the processor circuitry to operate the command line interface or the web-based graphical user interface to display a report to a developer of the target resource.

15. A method comprising:
   accessing a benchmark associated with a target resource, the benchmark including a profile that permits a user increase of a security constraint and prevents a user reduction of the security constraint;
   filtering rules that are inapplicable to the target resource to determine a set of applicable rules;
   evaluating the target resource against of the set of applicable rules;
   in response to the evaluation, accessing an operations database including a remediation action on the target resource;
   making available a representational state transfer (REST) application programming interface (API) for configuration of the apparatus; and
   presenting a web-based graphical user interface to display a report from the apparatus including the set of applicable rules.

16. The method of claim 15, wherein the method is associated with at least one of a virtual machine or an executable container, the at least one of the virtual machine or the executable container disposed on a server remote from the target resource.

17. The method of claim 15, further including enabling, disabling, or tailoring ones of the plurality of rules by editing at least one profile parameter.

18. The method of claim 17, further including invoking a remediation action for ones of the plurality of rules that fails after a change to the at least one profile parameter.

19. The method of claim 15, further including establishing a secure communication with the target resource, the secure communication based on at least one of a mutual secret, a certificate, or a keypair.

20. The method of claim 15, further including operating a command line interface, and at least one of the command line interface or the web-based graphical user interface displaying a report to a developer of the target resource.

* * * * *